United States Patent
Lawrenson et al.

(10) Patent No.: US 11,048,148 B2
(45) Date of Patent: Jun. 29, 2021

(54) IMAGING DEVICE AND CONTACT LENS

(71) Applicant: Telefonaktiebolaget LM Ericsson (publ), Stockholm (SE)

(72) Inventors: Matthew John Lawrenson, Bussigny (CH); Jacob Ström, Stockholm (SE); Lars Andersson, Solna (SE); Till Burkert, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/493,676

(22) PCT Filed: Mar. 30, 2017

(86) PCT No.: PCT/EP2017/057586
§ 371 (c)(1),
(2) Date: Sep. 12, 2019

(87) PCT Pub. No.: WO2018/177528
PCT Pub. Date: Oct. 4, 2018

(65) Prior Publication Data
US 2020/0012175 A1 Jan. 9, 2020

(51) Int. Cl.
*G03B 17/04* (2021.01)
*G02C 7/04* (2006.01)
(Continued)

(52) U.S. Cl.
CPC ............ *G03B 17/04* (2013.01); *G02C 7/049* (2013.01); *G02C 7/083* (2013.01); *G03B 13/36* (2013.01); *G02F 1/1343* (2013.01); *G02F 1/294* (2021.01)

(58) Field of Classification Search
None
See application file for complete search history.

(56) References Cited

U.S. PATENT DOCUMENTS

| 3,543,666 A | * | 12/1970 | Kazel | ..................... G02B 7/305 396/51 |
| 3,936,849 A | * | 2/1976 | Tsujimoto | ................ G02B 7/36 396/51 |

(Continued)

FOREIGN PATENT DOCUMENTS

| CN | 1607453 A | 4/2005 |
| CN | 105653227 A | 6/2016 |

(Continued)

OTHER PUBLICATIONS

Swegmark, Gunnar, et al., "Impedance Cyclography—A New Method for Accommodation Recording," Acta Ophthalmologica, vol. 46, 1968, pp. 946-968.

(Continued)

*Primary Examiner* — William B Perkey
(74) *Attorney, Agent, or Firm* — Withrow & Terranova, PLLC (57) ABSTRACT

An imaging device comprising a first camera with a controllable focus is provided. The imaging device is operative to detect that a user of the imaging device intends to capture an image of an object using the first camera, control the focus of the first camera to assume a target focal length, and capture the image. The target focal length is derived based on a measured accommodation of an eye lens of the user. Further, a contact lens comprising an eye-accommodation detector and a communications module is provided. The contact lens is operative to measure an accommodation of an eye lens to which the contact lens is attached, and transmit, to an imaging device comprising a first camera with a controllable focus, information pertaining to the measured accommodation of the eye lens and/or a focal length of the eye lens corresponding to the measured accommodation.

21 Claims, 5 Drawing Sheets

(51) Int. Cl.
  G02C 7/08 (2006.01)
  G03B 13/36 (2021.01)
  *G02F 1/1343* (2006.01)
  *G02F 1/29* (2006.01)

(56) References Cited

U.S. PATENT DOCUMENTS

| | | | |
|---|---|---|---|
| 5,515,131 A | 5/1996 | Ohmori et al. | |
| 9,158,133 B1 | 10/2015 | Pletcher et al. | |
| 9,225,895 B2 * | 12/2015 | Kozinski | H04N 5/232121 |
| 2004/0027536 A1 | 2/2004 | Blum et al. | |
| 2006/0224238 A1 | 10/2006 | Azar | |
| 2008/0080846 A1 | 4/2008 | Grip | |
| 2014/0375772 A1 | 12/2014 | Gabara | |

FOREIGN PATENT DOCUMENTS

| | | |
|---|---|---|
| JP | 2001281520 A | 10/2001 |
| NO | 2016180702 A1 | 11/2016 |
| WO | 2007107589 A1 | 9/2007 |
| WO | 2011067391 A1 | 6/2011 |
| WO | 2012051167 A1 | 4/2012 |
| WO | 2015043274 A1 | 4/2015 |
| WO | 2015191240 A1 | 12/2015 |

OTHER PUBLICATIONS

Wolffsohn, James Stuart, et al. "Dynamic Measurement of Accommodation and Pupil Size Using the Portable Grand Seiko FR-5000 Autorefractor," Optometry and Vision Science, vol. 83, No. 5, American Academy of Optometry, May 2006, pp. 306-310.

International Search Report and Written Opinion for International Patent Application No. PCT/EP2017/057586, dated Feb. 13, 2018, 16 pages.

Office Action for Chinese Patent Application No. 201780089241.X, dated Feb. 1, 2021, 17 pages.

Examination Report for European Patent Application No. 17717097.4, dated Mar. 1, 2021, 6 pages.

* cited by examiner

IMAGING DEVICE AND CONTACT LENS

This application is a 35 U.S.C. § 371 national phase filing of International Application No. PCT/EP2017/057586, filed Mar. 30, 2017, the disclosure of which is incorporated herein by reference in its entirety.

TECHNICAL FIELD

The invention relates to an imaging device, a method thereof, a contact lens, a method thereof, corresponding computer programs, and corresponding computer program products.

BACKGROUND

Digital cameras modules which are provided with mobile computing device such as mobile phones, smartphones, tablets, and the like, have been steadily improving with each new generation, despite limitations in size and cost. Whereas earlier generations of cameras used to be equipped with fixed-focus lenses, most built-in cameras of modern mobile computing devices are provided with autofocus and/or range-finding technology, allowing for an improved image quality at a fixed number of pixels.

Autofocus solutions typically analyze the incoming light on the image sensor of the camera to determine the correct focus. This can, e.g., be achieved by phase detection or contrast measurement, or by varying the camera settings to find the optimum focus. No direct information about which part of an image is of interest to the user, and should be in focus, is detected. Rather, the correct focus is determined based on the information contained within the image itself and optionally information from depth sensors.

Solutions based on gaze tracking are able detect where the user is looking, by analyzing the gaze direction of the user, and utilize a rangefinder to measure the distance to one or more objects placed at the location at which the user is gazing. Gaze-tracking solutions are oftentimes complex, requiring high-precision eye-trackers to deduce the direction of the eye, and are difficult to implement in mobile computing devices.

Another solution to increase image quality at a fixed number of pixels is to use two lenses with different properties, e.g., with respect to zoom, to obtain two separate images (dual lens). The two images can then be combined to create a final image with increased detail, depth of field, etc.

The development of Augmented-Reality (AR) glasses such as the Google Glass is likely to increase the rate and ease at which people capture images. Snapchat has recently announced a product called "Spectacles", which can be used to easily obtain footage simulating the user's natural point of view by using a built-in camera.

SUMMARY

It is an object of the invention to provide an improved alternative to the above techniques and prior art.

More specifically, it is an object of the invention to provide an improved autofocus solution for imaging devices.

These and other objects of the invention are achieved by means of different aspects of the invention, as defined by the independent claims. Embodiments of the invention are characterized by the dependent claims.

According to a first aspect of the invention, an imaging device is provided. The imaging device may, e.g., be a digital camera or a mobile computing device such as a mobile phone, a smartphone, a mobile terminal, a tablet, an AR headset, a Head-Mounted Display (HMD), a wearable, a smartwatch, glasses with a built-in camera, or the like. The imaging device comprises a first camera with a controllable focus. The imaging device is operative to detect that a user of the imaging device intends to capture an image of an object using the first camera, to control the focus of the first camera to assume a target focal length, and to capture the image. The target focal length is derived based on a measured accommodation of an eye lens of the user.

According to a second aspect of the invention, a contact lens is provided. The contact lens comprises an eye-accommodation detector and a communications module. The contact lens is operative to measure an accommodation of an eye lens to which the contact lens is attached, and to transmit information to an imaging device comprising a first camera with a controllable focus. The transmitted information pertains to at least one of: the measured accommodation of the eye lens, a focal length of the eye lens corresponding to the measured accommodation, and a target focal length of the first camera.

According to a third aspect of the invention, a method of an imaging device is provided. The imaging devices comprises a first camera with a controllable focus. The method comprises detecting that a user of the imaging device intends to capture an image of an object using the first camera, controlling the focus of the first camera to assume a target focal length, and capturing the image. The target focal length is derived based on a measured accommodation of the eye lens of the user.

According to a fourth aspect of the invention, a method of a contact lens is provided. The contact lens comprises an eye-accommodation detector and a communications module. The method comprises measuring an accommodation of an eye lens to which the contact lens is attached, and transmitting information to an imaging device comprising a first camera with a controllable focus. The transmitted information pertains to at least one of: the measured accommodation of the eye lens, a focal length of the eye lens corresponding to the measured accommodation, and a target focal length of the first camera.

According to a fifth aspect of the invention, a computer program is provided. The computer program comprises computer-executable instructions for causing a device to perform the method according to an embodiment of the third or fourth aspect of the invention, when the computer-executable instructions are executed on a processing unit comprised in the device.

According to a sixth aspect of the invention, a computer program product is provided. The computer program product comprises a computer-readable storage medium which has the computer program according to the fifth aspect of the invention embodied therein.

The invention makes use of an understanding that an improved autofocus solutions for imaging devices, such as, e.g., digital cameras, smartphones, glasses with a built-in camera, AR headsets, HMDs, and other mobile computing devices, may be achieved by adjusting the focus of the imaging device, e.g., by adjusting the focus of a camera comprised in the imaging device, based on a measured eye accommodation of the user of the imaging device. The measured eye accommodation reflects a current focal length of the eye lens and, consequently, the distance to an object which the user is gazing at.

In general, accommodation is the process of adjusting the focus, also referred to as focus distance or focal length, of an optical instrument to the object which is to be viewed. The human eye lens is flexible and its curvature is controlled by ciliary muscles through the zonules. Eye accommodation refers to the process of changing the curvature of the eye lens, allowing a person to focus the eye on objects at different distances from it. At short focal distance the ciliary muscle contracts, zonule fibers loosen, and the lens thickens, resulting in a rounder shape and thus high refractive power. Changing focus to an object at a greater distance requires the relaxation of the lens and thus increasing the focal distance.

A camera with controllable focus may, e.g., utilize optics comprising one or more lenses which are controllably adjustable relative to each other and/or relative to an image sensor of the camera.

Embodiments of the invention are advantageous in that the focal length of an imaging device, or rather of a camera comprised in the imaging device, can be adjusted so as to be commensurate with a current focal length of an eye lens of the user of the imaging device. This enables the user of the imaging device to capture an image of a desired object, such as a person, an animal, a plant, a building, or any other physical object, with a suitable setting for the focal length by simply gazing at the desired object. When the eye lens has accommodated to the focal length corresponding to the distance to the desired object, the focal length of the camera comprised in the imaging device is adjusted based on the measured accommodation of the eye lens. This enables capturing images which take the desired focus of the user into account.

According to an embodiment of the first aspect of the invention, the imaging device is further operative to receive information pertaining to at least one of: the measured accommodation of the eye lens, a focal length of the eye lens corresponding to the measured accommodation, and the target focal length of the first camera. The received information may, e.g., be comprised in a message or encoded in a signal, and may be received via a communications module which is comprised in the imaging device.

Preferably, the information is received from an embodiment of the contact lens in accordance with the second aspect of the invention. Optionally, if the received information pertains to the measured accommodation of the eye lens and/or a focal length of the eye lens corresponding to the measured accommodation, the target focal length of the first camera is derived from the received information. This may, e.g., be achieved by using a look-up table, a mathematical function, or a set of parameters.

According to another embodiment of the first aspect of the invention, the imaging device is further operative to measure the accommodation of the eye lens, and to derive the target focal length of the first camera based on the measured accommodation of the eye lens. For instance, the imaging device may further comprise a light source configured to emit structured light, preferably Infrared (IR) light, and a second camera configured to capture an image a fundus of the eye. The imaging device is operative to measure the accommodation of the eye lens by identifying a reflection of the structured light by the fundus, by image processing the captured image, and comparing a structure of the identified reflection with a structure of the emitted structured light. For example, the structured light may be composed of two pairs of parallel bars of light, one horizontal pair and one vertical pair, respectively, where the respective distance between the two bars of each pair is a measure of the eye accommodation.

According to an embodiment of the first aspect of the invention, the imaging device is operative to detect that the user intends to capture an image of an object by any one, or a combination of: receiving an instruction from the user, detecting that a timer has expired, e.g., a self-timer, detecting that the accommodation of the eye lens is substantially stable, i.e., the user's eye has stopped switching gaze, and detecting that a gaze of the user is substantially stable. For instance, the instruction may be a spoken instruction, the user pressing a button, the user performing a gesture with a hand or other body part, or an eye gesture.

According to an embodiment of the second aspect of the invention, the eye-accommodation detector comprises one or more pairs of electrodes arranged to measure an electrical impedance of a ciliary muscle of the eye. The contact lens is operative to measure the accommodation of the eye lens by measuring the electrical impedance of the ciliary muscle of the eye. This embodiment is based on impedance cyclography, which is a method for determining eye accommodation by measuring electrical impedance. Optionally, the contact lens may be operative to derive the focal length of the eye lens and/or the target focal length of the first camera from the measured accommodation of the eye lens.

According to another embodiment of the second aspect of the invention, the eye-accommodation detector comprises one or more shape sensors arranged to measure a change in curvature of the eye lens. The contact lens is operative to measure the accommodation of the eye lens by measuring a change in curvature of the eye lens. Optionally, the contact lens may be operative to derive the focal length of the eye lens and/or the target focal length of the first camera from the measured accommodation of the eye lens.

Even though advantages of the invention have in some cases been described with reference to embodiments of the first and second aspect of the invention, corresponding reasoning applies to embodiments of other aspects of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
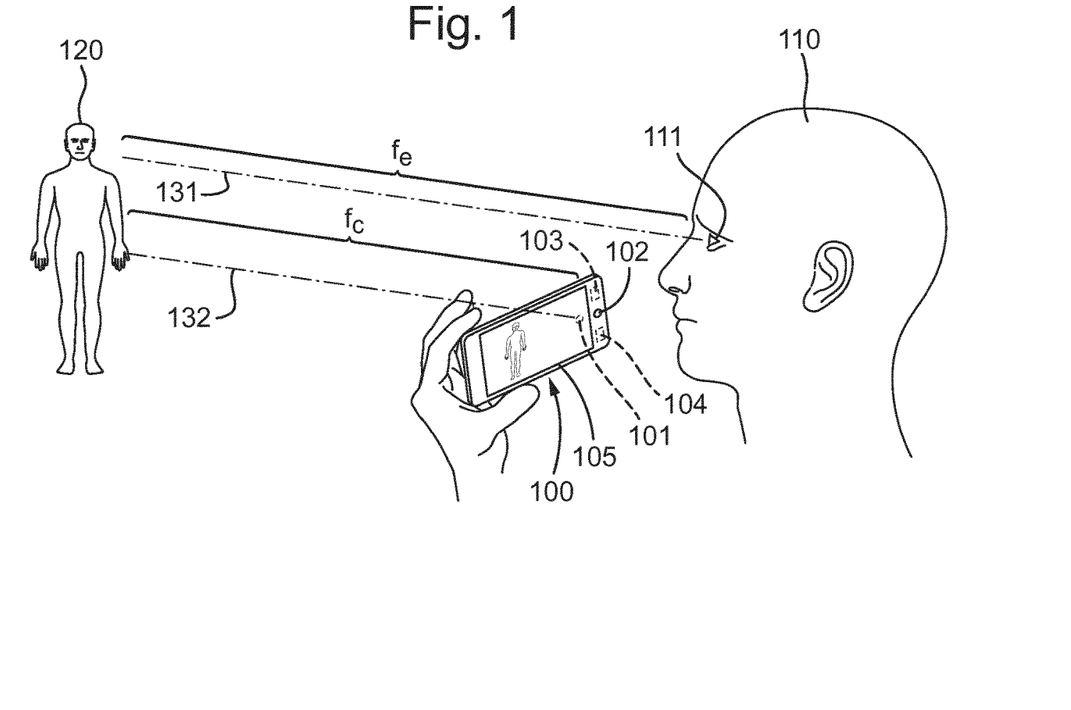
FIG. 1 shows an imaging device, in accordance with an embodiment of the invention.

In FIG. 1, an embodiment 100 of the imaging device is illustrated as a mobile phone or smartphone, comprising a first camera 101, a processing means 103, an optional communications module 104, and an optional display 105, e.g., a touchscreen. First camera 101 is in FIG. 1 illustrated as a rear-facing camera, i.e., a camera which is provided on the rear face of imaging device 100 and which is arranged for capturing an image of an object, such as a person 120. First camera 101 may, e.g., be of a type which is typically provided with today's smartphones and tablets. In particular, first camera 101 is provided with a controllable focus, e.g., by utilizing optics comprising one or more lenses which are controllably adjustable relative to each other and/or relative to an image sensor of first camera 101.

In FIG. 1, imaging device 100 is illustrated as being held by a user 110 so as to capture an image of object 120, i.e., a direction of view 132 of first camera 101 is directed towards object 120, with the distance between first camera 101 and object 120 being denoted as $f_c$. The distance $f_c$ represents the target focal length of first camera 101, i.e., the focal length to which the optics of first camera 101 is to be adjusted in order to capture an image of object 120 with optimal focus.

Figure 2:
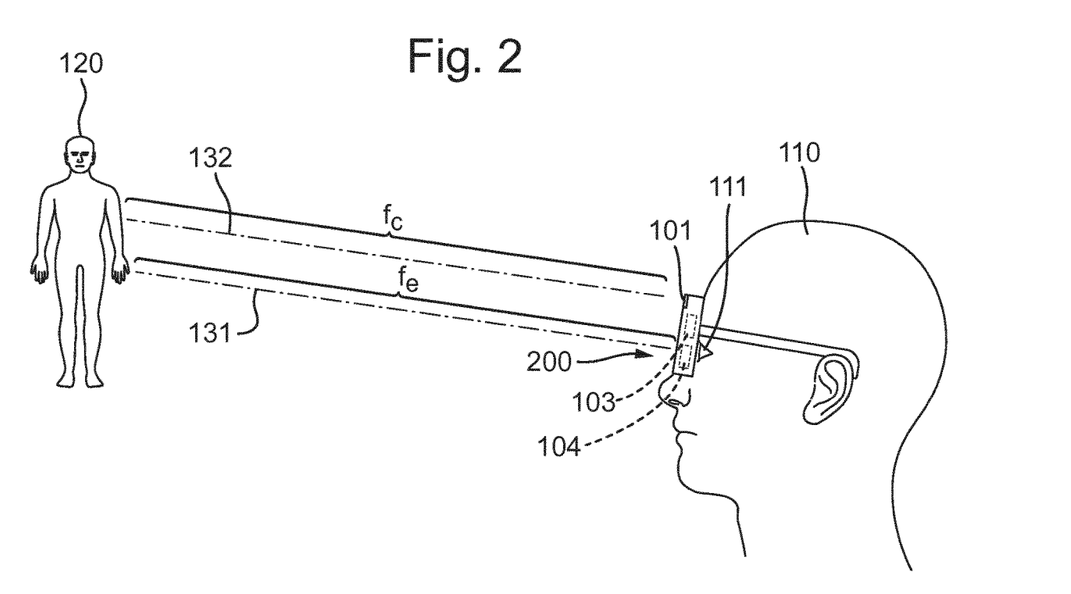
FIG. 2 shows an imaging device, in accordance with another embodiment of the invention.

In FIG. 2, an alternative embodiment 200 of the imaging device is illustrated as glasses, also referred to as eye glasses or spectacles. As an alternative to glasses, the imaging device may also be embodied as an AR headset or HMD, which typically are provided with one or more displays. Imaging device 200 is similar to imaging device 100 shown in FIG. 1, and comprises a first camera 101, a processing means 103, and an optional communications module 104. First camera 101 is in FIG. 1 illustrated as facing into substantially the same direction as user 110 wearing glasses 200, and is arranged for capturing an image of an object, such as a person 120. First camera 101 may, e.g., be of a type which is typically provided with today's smartphones and tablets. In particular, first camera 101 is provided with a controllable focus, e.g., by utilizing optics comprising one or more lenses which are controllably adjustable relative to each other and/or relative to an image sensor of first camera 101.

Further with reference to FIGS. 1 and 2, imaging devices 100 and 200 (in the following referred to as imaging device 100/200) are operative to detect that user 110 intends to capture an image of object 120 using first camera 101, to control the focus of first camera 101 to assume a target focal length $f_c$, and to capture the image. The target focal length $f_c$ is derived based on a measured accommodation of an eye lens of an eye 111 of user 110. To this end, embodiments of the invention rely on a measured accommodation of the eye lens, or a measure derived therefrom, such as a current focal length $f_e$ of the eye lens, to set the target focal length $f_c$ of first camera 101. The target focal length corresponds to the setting of the focal length of first camera 101 which results in an optimally focused image of object 120. Embodiments of the invention are based on an understanding that user 110 is gazing at the object which he or she intends to capture in an image, such as person 120 illustrated in FIGS. 1 and 2, in which the direction of gaze 131 of eye 111 is illustrated.

Advantageously, by adjusting the target focal length $f_c$ of first camera 101 to a focal length which is commensurate with the current focal length $f_e$ of the eye lens, user 110 of imaging device 100/200 may capture an image of object 120 by simply gazing at object 120 to set the focus of first camera 101 to be commensurate with the current focal length $f_e$ of the eye lens.

There are different ways of detecting that user 110 intends to capture an image of object 120. For instance, imaging device 100/200 may be operative to receive an instruction from user 110. This may, e.g., be a spoken instruction uttered by user 110 and received by a microphone comprised in imaging device 100/200 (not illustrated in FIGS. 1 and 2), or user 110 pressing a button on imaging device 100/200, e.g., a virtual button displayed on touchscreen 105 comprised in imaging device 100, after user 110 has fixated his/her gaze on object 120. The instruction received from user 110 may alternatively be an eye gesture performed by user 110, e.g., blinking twice. Such an eye gesture may be detected by utilizing a second, front-facing camera 102 which is provided on a front face of imaging device 100, i.e., facing user 110 while holding imaging device 100 to capture an image of object 120, as is illustrated in FIG. 1. Alternatively, the eye-gesture may be detected by utilizing a second camera comprised in imaging device 200 (not shown in FIG. 2), arranged so as to capture an image of the eye or eyes of user 110.

Alternatively, imaging device 100/200 may be operative to detect that a timer has expired. Self-timers are well known in the field of cameras and photography, and may be set to a value which allows user 110 to gaze at object 120 and let his/her eye lens accommodate before an image is captured.

As a further alternative, imaging device 100/200 may be operative to detect that user 110 intends to capture an image of object 120 by detecting that the accommodation of the eye lens of eye 111 is substantially stable, i.e., that user 110 has stopped switching gaze. This may, e.g., be achieved by monitoring the measured accommodation of the eye lens over time and determining that the accommodation of the eye lens is substantially stable if a variation of the measured eye accommodation is below a certain threshold value during a fixed period of time, e.g., half a second or one second. The threshold value may, e.g., be set to a value between 1 and 10%. The threshold value may either be configured by user 110, by a manufacturer of imaging device 100/200, or by a provider of a photo app, or the like, which is executed by processing means 103 comprised in imaging device 100/200.

As yet a further alternative, imaging device 100/200 may be operative to detect that user 110 intends to capture an image of object 120 by detecting that a gaze of user 110 is substantially stable, i.e., that a variation of direction of gaze 131 over time is below a certain threshold value during a fixed period of time, e.g., half a second or one second. The threshold value may, e.g., be set to a value between 1 and 10%. The threshold value may either be configured by user 110, by a manufacturer of imaging device 100/200, or by a provider of a photo app, or the like, which is executed by processing means 103 comprised in imaging device 100/

200. The direction of gaze of user 100 may, e.g., be monitored by utilizing front-facing camera 102 of imaging device 100, or the second camera comprised in imaging device 200. More specifically, by analyzing a sequence of images capturing the eye or eyes of user 110, direction of gaze 131 may be determined by tracking the corneal reflection (the first Purkinje image) and the center of the pupil over time.

It will also be appreciated that imaging device 100/200 may be operative to detect that user 110 intends to capture an image of object 120 based on any combination of the above alternatives. For instance, imaging device 100/200 may be operative to start a self-timer with a duration of, e.g., one second, in response to receiving a user instruction, and to capture an image when the self-timer has expired. In this way, user 110 can initiate capturing of an image by, e.g., pressing a button, and then gazing at object 120 before the accommodation of the eye lens of eye 111 is measured and an image is captured.

Imaging device 100/200 may by operative to control the focus of first camera 101 to assume the target focal length $f_c$ based on an accommodation of the eye lens which is measured by a separate device, e.g., an embodiment 300 of the contact lens according to the second aspect of the invention, which is described in further detail below, with reference to FIG. 3. Alternatively, imaging device 100/200 may be operative to control the focus of first camera 101 to assume the target focal length $f_c$ based on information pertaining to the current focal length $f_e$, also referred to as focal distance, of the eye lens as determined by a contact lens comprising a capacitive sensor, as disclosed in WO 2015/191240 A1.

More specifically, imaging device 100/200 may comprise a communications module 104 which is operative to effect wireless communications through a Wireless Local Arena Network (WLAN)/Wi-Fi network, Bluetooth, ZigBee, or any other short-range communications technology. Alternatively, or additionally, communications module 104 may further be operative to effect wireless communications with a Radio Access Network (RAN) based on a cellular telecommunications technique such as the Global System for Mobile communications (GSM), Universal Mobile Telecommunications System (UMTS), Long Term Evolution (LTE), or any 5G standard, e.g., Next Generation (NG) and New Radio (NR). As yet a further alternative, communications module 104 may be operative to effect wireless communications using light, e.g., Visible Coded Light (VLC), or IR light.

Imaging device 100/200 is further operative to receive, via communications module 104, information pertaining to the measured accommodation of the eye lens, the focal length $f_e$ of the eye lens which corresponds to the measured accommodation, or the target focal length $f_c$ of first camera 101. The information may, e.g., be comprised in a message, e.g., as an information element contained in a Constrained Application Protocol (CoAP) or HyperText Transfer Protocol (HTTP) message, or encoded in a signal using amplitude, frequency, or phase modulation. The information may be received from any other device which is capable of measuring the eye accommodation of the eye lens, in particular from contact lens 300 which is attached to eye 111 (see FIG. 3).

The information pertaining to the measured accommodation of the eye lens may, e.g., comprise a value representing the measured accommodation of the eye lens, which is typically expressed in units of optical power, i.e., Diopter or $m^{-1}$. The measured eye accommodation may either be expressed in absolute values or as difference between the measured eye accommodation and the far point (which is characterized by no eye accommodation, i.e., a relaxed ciliary muscles) or the near point (which is characterized by maximum accommodation), respectively. Alternatively, information pertaining to the focal length $f_e$ of the eye lens may be received, e.g., in units of lengths, i.e., m. It will also be appreciated that the information pertaining to the measured accommodation of the eye lens may alternatively comprise any measure derived from the measured accommodation of the eye lens or the corresponding focal length $f_e$. For instance, the received information may comprise the target focal length $f_c$ of first camera 101, thereby accounting for a difference in focal lengths of the eye lens, $f_e$, and that of first camera 101, $f_c$, when focusing on the same object 120. The difference in focal length may be approximated by an estimated distance between eye 111 and first camera 101.

Further optionally, imaging device 100/200 may be operative to derive the target focal length $f_c$ of first camera 101 from the received information, in particular from information pertaining to the measured accommodation of the eye lens or the focal length $f_e$ of the eye lens corresponding to the measured accommodation. For instance, this may be achieved by utilizing a look-up table maintained by imaging device 100/200 which stores values for the target focal length $f_c$ and corresponding values of the measured accommodation of the eye lens. The look-up table may, e.g., be populated by using a calibration procedure, as is described further below. Alternatively, a mathematical function may be utilized, based on which the target focal length $f_c$ may be calculated for a value of the measured accommodation of the eye lens. For instance, the accommodation of the human eye may be modelled by as a thick-lens problem. If a calibration procedure is employed, a mathematical function which best represents the observed relation between the focal length of the eye lens, $f_e$, and the eye accommodation may be utilized and fitted to the measured values. Subsequently, the mathematical function may be used, with its fitted parameters, to calculate the focal length of the eye lens, $f_e$, for a measured value of the accommodation of the eye lens. If the focal length $f_e$ of the eye lens is received, the target focal length $f_c$ of first camera 101 may be calculated by adding a value accounting for a difference in focal lengths of the eye lens, $f_e$, and that of first camera 101, $f_c$, when focusing on the same object 120. The difference in focal length may be approximated by an estimated distance between eye 111 and first camera 101.

In the following, embodiments of the contact lens 300 in accordance with the second aspect of the invention are described with reference to FIG. 3. An embodiment of contact lens 300 may be used for measuring an accommodation of an eye lens of user 110, if contact lens 300 (shown in side-view in FIG. 3) is worn by user 110, i.e., is attached to an eye 111 of user 110. Two different embodiments 310 and 320 of contact lens 300 are shown in top-view in FIG. 3 and described in the following.

Contact lenses 310 and 320 (in the following referred to as contact lens 310/320) comprise an eye-accommodation detector 313 and 323, respectively, and a communications module 314, and are operative to measure an accommodation of an eye lens to which contact lens 310/320 is attached, and to transmit information pertaining to the measured accommodation of the eye lens, a focal length $f_e$ of the eye lens corresponding to the measured accommodation, or a target focal length $f_c$ of a first camera. The information is transmitted to an imaging device comprising a first camera with a controllable focus, such as imaging device 100/200 described hereinbefore. The transmitted information may, e.g., be comprised in a message, e.g., as an information element contained in a CoAP or HTTP message, or encoded in a signal using amplitude, frequency, or phase modulation.

A first embodiment 310 of contact lens 300 may be based on shape sensors. More specifically, eye-accommodation detector 313 comprises one or more shape sensors 311 and 312 which are arranged to measure a change in curvature of the eye lens to which contact lens 310 is attached. For instance, as is illustrated in FIG. 3, a first pair of shape sensors 311 may be provided to measure a change in curvature along a first direction, and a second pair of shape sensors 312 may be provided to measure change in curvature along a second direction which is substantially perpendicular to the first direction. Thereby, the accuracy of the measured change in curvature is increased. In FIG. 3, a pair 311/312 of parallel stripe-shaped shape sensors is used, which are placed off the optical axis (which is assumed to substantially coincide with the center of contact lens 310) of the eye lens, when attached to an eye of user 110, so as to not obscure vision. This is particularly advantageous if shape sensors 311 and 312 are of a non-transparent material. Shape sensors 311 and 312 may, e.g., be based on piezo-electric materials, polymer electronics, or Microelectromechanical Systems (MEMS) technology. Contact lens 310 is operative to determine the accommodation of the eye lens by measuring a change in curvature of the eye lens, using eye-accommodation detector 313. Optionally, contact lens 310 may further be operative to derive the focal length $f_e$ of the eye lens, or the target focal length $f_c$ of the first camera, from the measured accommodation of the eye lens.

Figure 3:
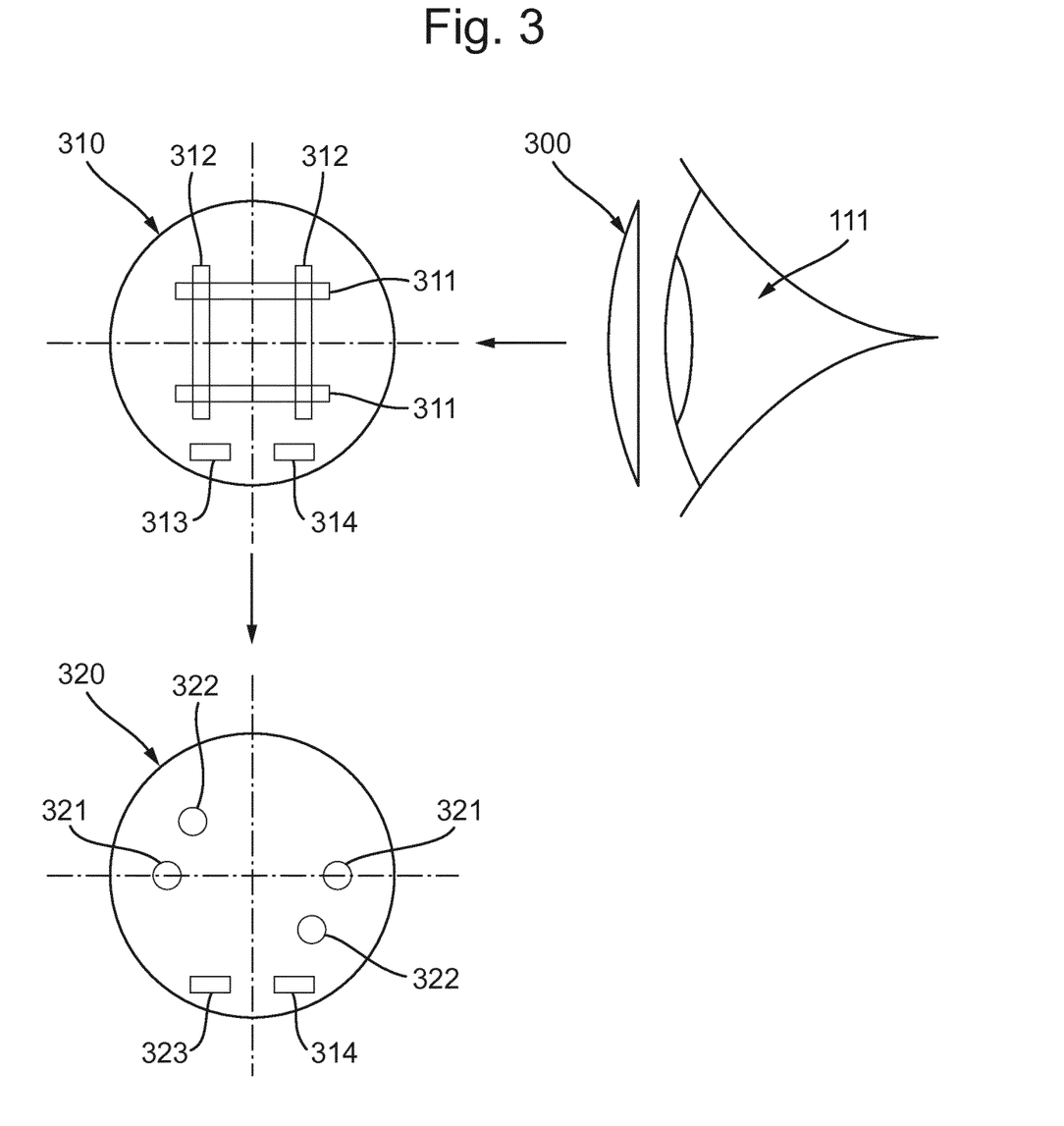
FIG. 3 shows contact lenses, in accordance with embodiments of the invention.

Further with reference to FIG. 3, a second embodiment 320 of contact lens 300 is based on impedance cyclography, which is a technique for measuring eye accommodation ("Impedance Cyclography—A New Method for Accommodation Recording", G. Swegmark and T. Olsson, Acta Ophtalmologica, vol. 46, pages 946-968, 1968). More specifically, eye-accommodation detector 323 comprises one or more pairs of electrodes 321 and 322 which are arranged to measure an electrical impedance of a ciliary muscle of eye 111. While one pair of electrodes is sufficient to measure electrical impedance, the four-electrode configuration illustrated in FIG. 3 advantageously eliminates contact impedance. Electrodes 321 and 322 may, e.g., be made of platinum or any other suitable conductive material. Contact lens 320 is operative to measure the accommodation of the eye lens by measuring the electrical impedance of the ciliary muscle, using eye-accommodation detector 323. Optionally, contact lens 320 may further be operative to derive the focal length $f_e$ of the eye lens, or the target focal length $f_c$ of the first camera, from the measured accommodation of the eye lens.

Eye-accommodation modules 313 and 323, and communications module 314, as well as any additional modules, may be implemented by any kind of electronic circuitry, e.g., any one, or a combination of, analogue electronic circuitry, digital electronic circuitry, polymer electronics, and processing means executing a suitable computer program, i.e., software. It will also be appreciated that the electrical power which is required for operating an embodiment of contact lens 310/320, or charging a battery comprised in contact lens 310/320, may, e.g., be harvested from light (see, e.g., U.S. Pat. No. 9,158,133 B1) or by means of wireless inductive charging. As an alternative to receiving information pertaining to a measured accommodation of the eye lens of user 110 from a separate device, such as contact lens 300, imaging device 100/200 may alternatively be operative to measure the accommodation of the eye lens, and to derive the target focal length $f_c$ of first camera 101 based on the measured accommodation of the eye lens. This may, e.g., be achieved by using structured light which is reflected from the fundus of eye 111 ("Dynamic Measurement of Accommodation and Pupil Size Using the Portable Grand Seiko FR-5000 Autorefractor", by J. S. Wolffsohn, K. Ukai, and B. Gilmartin, Optometry and Vision Science, vol. 83, pages 306-310, American Academy of Optometry, 2006), as is described in the following with reference to FIG. 4. The fundus of the eye is the interior surface of the eye opposite the lens and includes, among other parts, the retina.

An embodiment of the imaging device relying on structured light is described with reference to imaging device 200 illustrated in FIG. 2, which is in the form of glasses worn by user 110, but may alternatively be embodied by a handheld imaging device of the type illustrated in FIG. 1, such as a mobile phone or smartphone.

Figure 4:
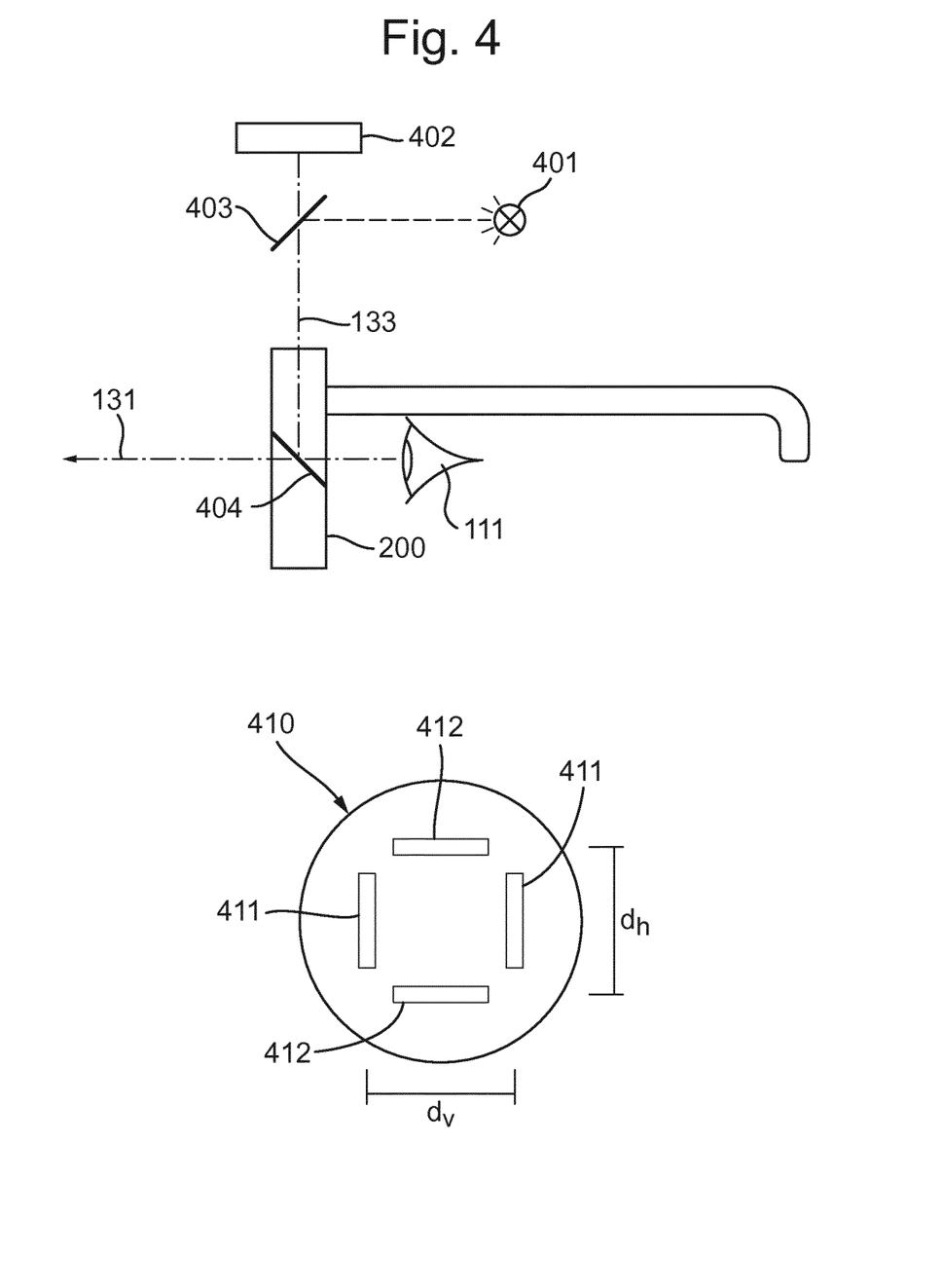
FIG. 4 illustrates determining an accommodation of an eye lens, in accordance with embodiments of the invention.

With reference to FIG. 4, imaging device 200 may further comprise a light source 401 configured to emit structured light, preferably IR light, along optical axis 133, and a second camera 402 configured to capture an image of a fundus of eye 111. As is illustrated in FIG. 4, two optical elements 403 and 404 operating as beam splitters, such as cubes which are it is made from two triangular glass prisms which are glued together or semi-transparent mirrors, are used for guiding the emitted structure light from light source 401 to eye 111 without obscuring direction of view 131, and for enabling second camera 402 to capture an image of the reflections by the fundus of eye 111. It will be appreciated that the optical system 400 shown in FIG. 4 is only one example for arranging light source 401 and second camera 402, and embodiments of the imaging device may be based on alternative arrangements which are known in the art. For the sake of simplicity, the size of light source 401, second camera 402, and optical elements 403 and 404, has been exaggerated in FIG. 4, and structural means for attaching elements 401-404 to glasses 200 have been omitted.

Further with reference to FIG. 4, a schematic front-view of the fundus 410 of eye 111 illustrates the reflections 411 and 412 of the structured light emitted by light source 401 off fundus 410. For the example illustrated in FIG. 4, the emitted structured light is composed of two pairs of parallel bars of light, one vertical pair 411 and one horizontal pair 412, respectively. The distance between the two bars of each pair, $d_v$, for vertical pair 411 and do for horizontal pair 412, respectively, is a measure of the refractive power of the eye lens and is related to the accommodation of the eye lens ("Dynamic Measurement of Accommodation and Pupil Size Using the Portable Grand Seiko FR-5000 Autorefractor", by J. S. Wolffsohn, K. Ukai, and B. Gilmartin, Optometry and Vision Science, vol. 83, pages 306-310, American Academy of Optometry, 2006). While embodiments of the invention may alternatively rely on a single pair of bars 411 or 412, utilizing two pairs of bars which are substantially orthogonal to each other allows measuring the eye accommodation with higher accuracy.

To this end, an embodiment 200 of the imaging device comprising light source 401 and second camera 402 is further operative to identify reflection 411 and 412 of the structured light by the fundus, by image processing an image captured by second camera 402, and to compare a structure of identified reflections 411 and 412 with a structure of the emitted structured light. As is illustrated in FIG. 4, comparing a structure of identified reflections 411 and 412 with a structure of the emitted structured light may, e.g., comprise measuring at least one of distances $d_v$ and $d_h$, and comparing the measured distance(s) to the known separations of the vertical bars and/or the horizontal bars, respectively, emitted by light source 401. Based on the comparison, the refractive power of the eye lens, and hence its accommodation, may be determined. Alternatively, the curvature of the eye lens may be derived, either by using a lens formula or based on information obtained from a calibration procedure. As yet a further alternative, the focal length of the eye lens, $f_e$, may be derived based on information obtained from a calibration procedure.

Embodiments of the invention may rely on a calibration procedure for establishing a relation between a measured eye accommodation of an eye lens of user 110, which may, e.g., be measured by utilizing shape sensors, impedance cyclography, or structured light, and a current focal length $f_e$ of the eye lens corresponding to the measured eye accommodation. For instance, an embodiment of imaging device 100/200 may be operative, during a calibration phase, to measure the eye accommodation, or to receive information pertaining to the measured accommodation of the eye lens and/or a focal length of the eye lens corresponding to the measured accommodation, when user 110 is gazing at object 120 at a known distance (which corresponds to the focal lens of the accommodated eye lens, $f_e$). Imaging device 100/200 is further operative to store information pertaining to the eye accommodation of user 110 and the known distance. Preferably, the user's eye accommodation is measured, or information is received, for a number of different distances, i.e., eye accommodations and corresponding focal lengths $f_e$. This may, e.g., be achieved by instructing the user to gaze at different objects which are located at different, known distances from the user. The embodiment of the imaging device is further operative to store the measured eye accommodations and the corresponding known distances for later use. The measured eye accommodations and the corresponding known distances may, e.g., be stored associatively, in a list or database. Alternatively, an equation describing the relation between accommodation of the eye lens and its focal length may be fitted to the pairs of values, each pair comprising measured eye accommodation and known distance, so as to derive a set of parameters which are used to define the equation.

Subsequently, during normal use, the focal length $f_e$ of the eye lens may be derived based on the measured eye accommodation, either by looking up the focal length in a list or database, or by calculating the focal length using the fitted equation. The obtained focal length $f_e$ of the eye lens may be used directly as target focal length $f_c$ for first camera 101, thereby neglecting the difference in distance between $f_e$ and $f_c$. Alternatively, the obtained focal length $f_e$ of the eye lens may be corrected to account for the difference, e.g., by adding a value accounting for a difference in focal lengths of the eye lens, $f_e$, and that of first camera 101, $f_c$, when focusing on the same object 120. The difference in focal length may be approximated by an estimated distance between eye 111 and first camera 101.

During the calibration procedure, the measured eye accommodation may e.g., be stored, or used for fitting, in units of Diopters. Alternatively, rather than using the measured eye accommodation, embodiments of the imaging device may utilize the measured curvature of the eye lens, the measured electrical impedance of the ciliary muscle, or measurements of structured light reflected off the fundus, e.g., one or both of $d_v$ and $d_h$.

In the following, embodiments of processing means 103 comprised in embodiments of the imaging device, such as imaging devices 100 and 200, are described with reference to FIGS. 5 and 6.

Figure 5:
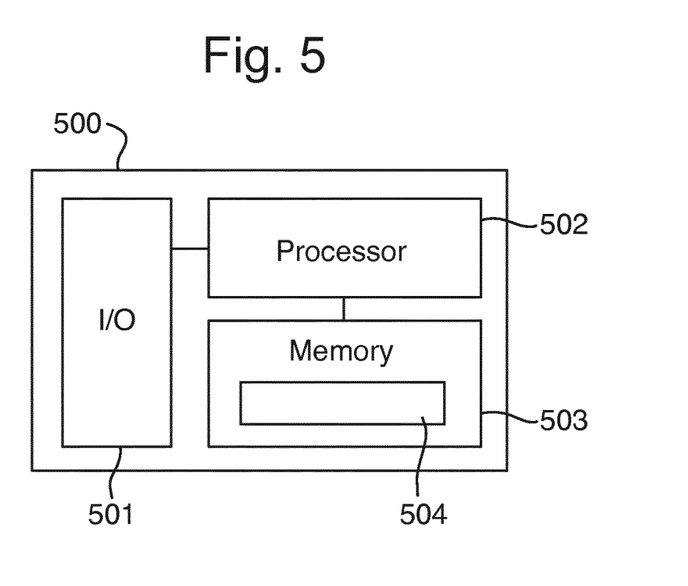
FIG. 5 shows an embodiment of the processing means comprised in the imaging device.

A first embodiment 500 of processing means 103 is shown in FIG. 5. Processing means 500 comprises a processing unit 502, such as a general purpose processor, and a computer-readable storage medium 503, such as a Random Access Memory (RAM), a Flash memory, or the like. In addition, processing means 500 comprises one or more interfaces 501 ("I/O" in FIG. 5) for controlling and/or receiving information from other components comprised in imaging device 100/200, such as first camera 101, second camera 102, communications module 104, and display 105. Memory 503 contains computer-executable instructions 504, i.e., a computer program or software, to cause imaging device 100/200 to become operative to perform in accordance with embodiments of the invention as described herein, when computer-executable instructions 504 are executed on processing unit 502.

Figure 6:
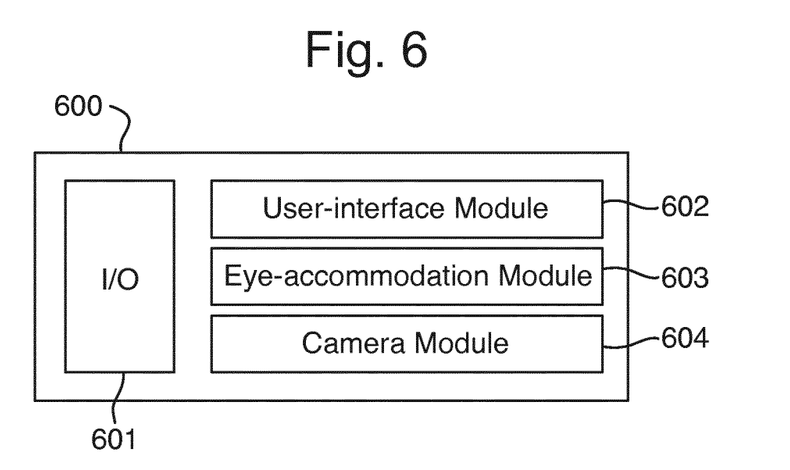
FIG. 6 shows another embodiment of the processing means comprised in the imaging device.

An alternative embodiment 600 of processing means 103 is illustrated in FIG. 6. Similar to processing means 500, processing means 600 comprises one or more interfaces 601 ("I/O" in FIG. 6) for controlling and/or receiving information from other components comprised in imaging device 100/200, such as first camera 101, second camera 102, communications module 104, and display 105. Processing means 600 further comprises a user-interface module 602, an eye-accommodation module 603, and a camera module 604, which are configured to cause imaging device 100/200 to perform in accordance with embodiments of the invention as described herein.

In particular, user-interface module 602 is configured to detect that a user of imaging device 100/200 intends to capture an image of an object using first camera 101. Camera module 604 is configured to control the focus of first camera 101 to assume a target focal length which is derived based on a measured accommodation of an eye lens of the user and capture the image. The target focal length is acquired from eye-accommodation module 603.

For instance, user-interface module 602 may be configured to detect that the user intends to capture an image of an object by any one, or a combination, of: receiving an instruction from the user, detecting that a timer has expired, detecting that the accommodation of the eye lens is substantially stable, and detecting that a gaze of the user is substantially stable.

Eye-accommodation module 603 may be configured to receive information pertaining to at least one of: the measured accommodation of the eye lens, a focal length of the eye lens corresponding to the measured accommodation, and the target focal length of first camera 101. The information is received via communications module 104. Optionally, if the received information pertains to the measured accommodation of the eye lens and/or a focal length of the eye lens corresponding to the measured accommodation, eye-accommodation module 603 may be configured to derive, from the received information, the target focal length of first camera 101.

Alternatively, eye-accommodation module 603 may further be configured to measure the accommodation of the eye lens, and to derive the target focal length of first camera 101 based on the measured accommodation of the eye lens. For instance, if imaging device 100/200 comprises a light source 401 configured to emit structured light and a second camera 402 configured to capture an image a fundus of the eye, eye-accommodation module 603 may be configured to identify a reflection of the structured light by the fundus, by image processing the captured image, and to compare a structure of the identified reflection with a structure of the emitted structured light.

Figure 7:
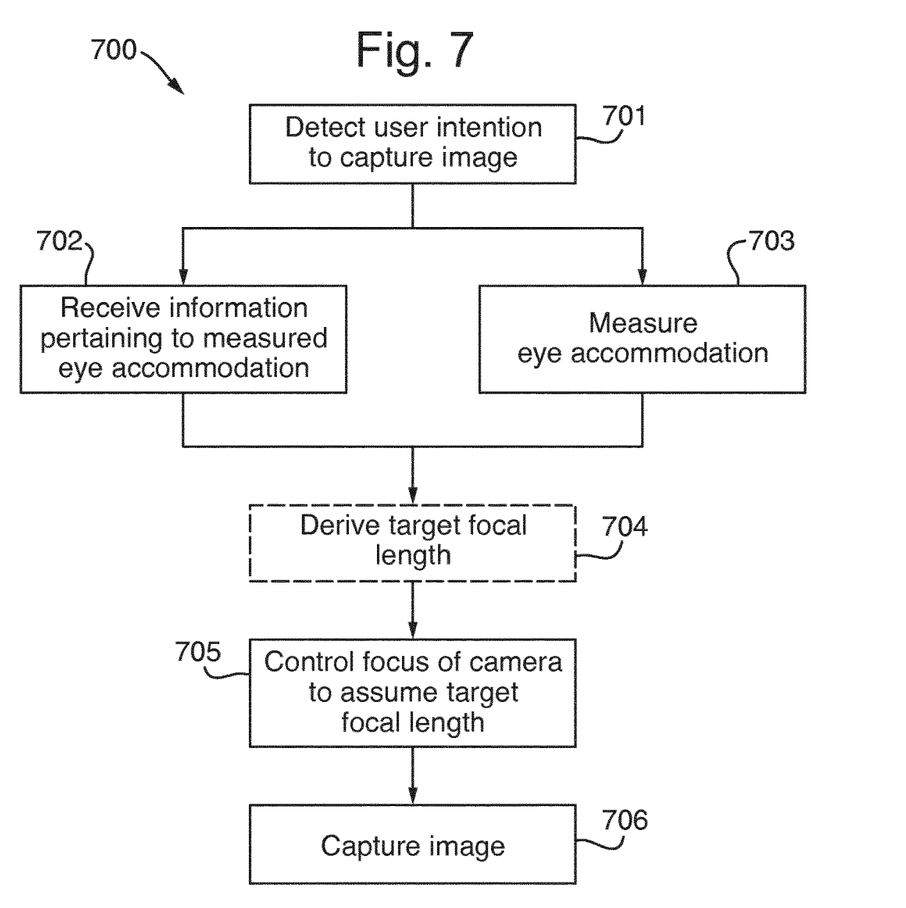
FIG. 7 illustrates a method of an imaging device, in accordance with embodiments of the invention.

Interfaces 501 and 601, and modules 602-604, as well as any additional modules comprised in processing means 600, may be implemented by any kind of electronic circuitry, e.g., any one, or a combination of, analogue electronic circuitry, digital electronic circuitry, and processing means executing a suitable computer program, i.e., software In the following, embodiments 700 of the method of an imaging device are described with reference to FIG. 7. The imaging device comprises a first camera with a controllable focus. An embodiment of method 700 may, e.g., be performed by a mobile phone, a smartphone, a mobile terminal, a tablet, an AR headset, an HMD, a wearable, a smartwatch, glasses with a built-in camera, or the like.

Method 700 comprises detecting 701 that a user of the imaging device intends to capture an image of an object using the first camera, controlling 705 the focus of the first camera to assume a target focal length which is derived based on a measured accommodation of the eye lens of the user, and capturing 706 the image.

For instance, detecting 701 that the user intends to capture an image of an object may comprise any one, or a combination, of: receiving an instruction from the user, detecting that a timer has expired, detecting that the accommodation of the eye lens is substantially stable, and detecting that a gaze of the user is substantially stable.

Method 700 may further comprise receiving 702 from an eye-accommodation detector information pertaining to at least one of: the measured accommodation of the eye lens, a focal length of the eye lens corresponding to the measured accommodation, and the target focal length of first camera 101. Optionally, if the received information pertains to the measured accommodation of the eye lens and/or a focal length of the eye lens corresponding to the measured accommodation, method 700 may further comprise deriving 704, from the received information, the target focal length of the first camera.

Alternatively, method 700 may further comprise measuring 703 the accommodation of the eye lens, and deriving 704 the target focal length of the first camera based on the measured accommodation of the eye lens. For instance, measuring 703 the accommodation of the eye lens may comprise emitting structured light from a light source comprised in the imaging device, capturing an image of a fundus of the eye, using a second camera comprised in the imaging device, identifying a reflection of the structured light by the fundus, by image processing the captured image, and comparing a structure of the identified reflection with a structure of the emitted structured light.

It will be appreciated that method 700 may comprise additional, or modified, steps in accordance with what is described throughout this disclosure. An embodiment of method 700 may be implemented as software, such as computer program 504, to be executed by a processing unit comprised in the imaging device, whereby the imaging device becomes operative to perform in accordance with embodiments of the invention described herein.

Figure 8:
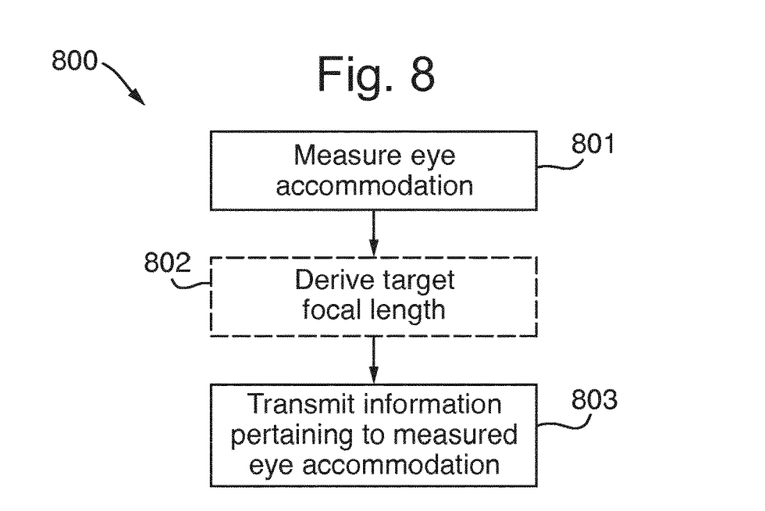
FIG. 8 illustrates a method of a contact lens, in accordance with embodiments of the invention.

In the following, embodiments 800 of the method of a contact lens are described with reference to FIG. 8. The contact lens comprises an eye-accommodation detector and a communications module.

Method 800 comprises measuring 801 an accommodation of an eye lens to which the contact lens is attached, and transmitting 803, to an imaging device comprising a first camera with a controllable focus, information pertaining to at least one of: the measured accommodation of the eye lens, a focal length of the eye lens corresponding to the measured accommodation, and a target focal length of the first camera.

For instance, measuring 801 an accommodation of a lens of an eye to which the contact lens is attached may comprise measuring an electrical impedance of a ciliary muscle of the eye, using two or more electrodes comprised in the eye-accommodation detector. Alternatively, measuring 801 an accommodation of a lens of an eye to which the contact lens is attached may comprise measuring a change in curvature of the eye lens, using one or more shape sensors comprised in the eye-accommodation detector.

Optionally, method 800 may further comprise deriving 802, from the measured accommodation of the eye lens, at least one of the focal length of the eye lens and the target focal length of the first camera.

It will be appreciated that method 800 may comprise additional, or modified, steps in accordance with what is described throughout this disclosure. An embodiment of method 800 may be implemented as software, such as a computer program, to be executed by a processing unit comprised in the contact lens, whereby the contact lens becomes operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. An imaging device comprising:
a first camera with a controllable focus,
the imaging device being operative to:
  detect that a user of the imaging device intends to capture an image of an object using the first camera,
  control the focus of the first camera to assume a target focal length which is derived based on a measured accommodation of an eye lens of the user, and
  capture the image.

2. The imaging device according to claim 1, being operative to detect that the user intends to capture an image of an object by any one, or a combination, of: receiving an instruction from the user, detecting that a timer has expired, detecting that the accommodation of the eye lens is substantially stable, and detecting that a gaze of the user is substantially stable.

3. The imaging device according to claim 1, further comprising a communications module, the imaging device being further operative to receive, via the communications module, information pertaining to at least one of: the measured accommodation of the eye lens, a focal length of the eye lens corresponding to the measured accommodation, and the target focal length of the first camera.

4. The imaging device according to claim 3, wherein the received information pertains to at least one of: the measured accommodation of the eye lens and a focal length of the eye lens corresponding to the measured accommodation, the imaging device being further operative to derive, from the received information, the target focal length of the first camera.

5. The imaging device according to claim 1, being further operative to:
measure the accommodation of the eye lens, and
derive the target focal length of the first camera based on the measured accommodation of the eye lens.

6. The imaging device according to claim 5, further comprising:
a light source configured to emit structured light, and
a second camera configured to capture an image a fundus of the eye, the imaging device being operative to measure the accommodation of the eye lens by:

identifying, by image processing the captured image, a reflection of the structured light by the fundus, and comparing a structure of the identified reflection with a structure of the emitted structured light.

7. A contact lens comprising:

an eye-accommodation detector, and a communications module, the contact lens being operative to:

measure an accommodation of an eye lens to which the contact lens is attached, and transmit, to an imaging device comprising a first camera with a controllable focus, information pertaining to at least one of: the measured accommodation of the eye lens, a focal length of the eye lens corresponding to the measured accommodation, and a target focal length of the first camera.

8. The contact lens according to claim 7, the eye-accommodation detector comprising one or more pairs of electrodes arranged to measure an electrical impedance of a ciliary muscle of the eye, the contact lens being operative to measure the accommodation of the eye lens by measuring the electrical impedance of the ciliary muscle of the eye.

9. The contact lens according to claim 7, the eye-accommodation detector comprising one or more shape sensors, the contact lens being operative to measure the accommodation of the eye lens by measuring a change in curvature of the eye lens.

10. The contact lens according to claim 7, being further operative to:

derive, from the measured accommodation of the eye lens, at least one of: the focal length of the eye lens and the target focal length of the first camera.

11. A method of an imaging device comprising a first camera with a controllable focus, the method comprising:

detecting that a user of the imaging device intends to capture an image of an object using the first camera, controlling the focus of the first camera to assume a target focal length which is derived based on a measured accommodation of the eye lens of the user, and capturing the image.

12. The method according to claim 11, wherein the detecting that the user intends to capture an image of an object comprises any one, or a combination, of: receiving an instruction from the user, detecting that a timer has expired, detecting that the accommodation of the eye lens is substantially stable, and detecting that a gaze of the user is substantially stable.

13. The method according to claim 11, further comprising receiving information pertaining to at least one of: the measured accommodation of the eye lens, a focal length of the eye lens corresponding to the measured accommodation, and the target focal length of the first camera.

14. The method according to claim 13, wherein the received information pertains to at least one of: the measured accommodation of the eye lens and a focal length of the eye lens corresponding to the measured accommodation, the method further comprising deriving, from the received information, the target focal length of the first camera.

15. The method according to claim 11, further comprising:

measuring the accommodation of the eye lens, and deriving the target focal length of the first camera based on the measured accommodation of the eye lens.

16. The method according to claim 15, wherein the measuring the accommodation of the eye lens comprises:

emitting structured light from a light source comprised in the imaging device, capturing an image of a fundus of the eye, using a second camera comprised in the imaging device, identifying, by image processing the captured image, a reflection of the structured light by the fundus, and comparing of a structure of the identified reflection with a structure of the emitted structured light.

17. A method of a contact lens comprising an eye-accommodation detector and a communications module, the method comprising:

measuring an accommodation of an eye lens to which the contact lens is attached, and transmitting, to an imaging device comprising a first camera with a controllable focus, information pertaining to at least one of: the measured accommodation of the eye lens, a focal length of the eye lens corresponding to the measured accommodation, and a target focal length of the first camera.

18. The method according to claim 17, wherein the measuring an accommodation of a lens of an eye to which the contact lens is attached comprises measuring an electrical impedance of a ciliary muscle of the eye, using two or more electrodes comprised in the eye-accommodation detector.

19. The method according to claim 17, wherein the measuring an accommodation of a lens of an eye to which the contact lens is attached comprises measuring a change in curvature of the eye lens, using one or more shape sensors comprised in the eye-accommodation detector.

20. The method according to claim 17, further comprising:

deriving, from the measured accommodation of the eye lens, at least one of: the focal length of the eye lens and the target focal length of the first camera.

21. A non-transitory computer-readable storage medium comprising a computer program product including instructions to cause at least one processor to:

detect that a user of an imaging device intends to capture an image of an object using a first camera, control focus of the first camera to assume a target focal length, which is derived based on a measured accommodation of an eye lens of a user, and capture the image.

* * * * *

UNITED STATES PATENT AND TRADEMARK OFFICE
CERTIFICATE OF CORRECTION

PATENT NO. : 11,048,148 B2  
APPLICATION NO. : 16/493676  
DATED : June 29, 2021  
INVENTOR(S) : Lawrenson et al.

Page 1 of 1

It is certified that error appears in the above-identified patent and that said Letters Patent is hereby corrected as shown below:

In the Specification

In Column 1, Line 35, delete "able detect" and insert -- able to detect --, therefor.

In Column 2, Lines 24-25, delete "comprises" and insert -- comprise --, therefor.

In Column 7, Line 1, delete "user 100" and insert -- user 110 --, therefor.

In Column 7, Line 35, delete "Arena" and insert -- Area --, therefor.

In Column 7, Line 47, delete "Visible Coded Light (VLC)," and insert -- Visible Light Communication (VLC), --, therefor.

In Column 9, Lines 36-37, delete "Ophtalmologica," and insert -- Ophthalmologica, --, therefor.

In Column 10, Line 45, delete "d$_v$," and insert -- d$_v$ --, therefor.

In Column 10, Line 45, delete "do" and insert -- d$_h$ --, therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*